Dec. 30, 1924.
W. A. HUBENER
ANCHOR BOLT NUT
Filed Dec. 6, 1923
1,521,025
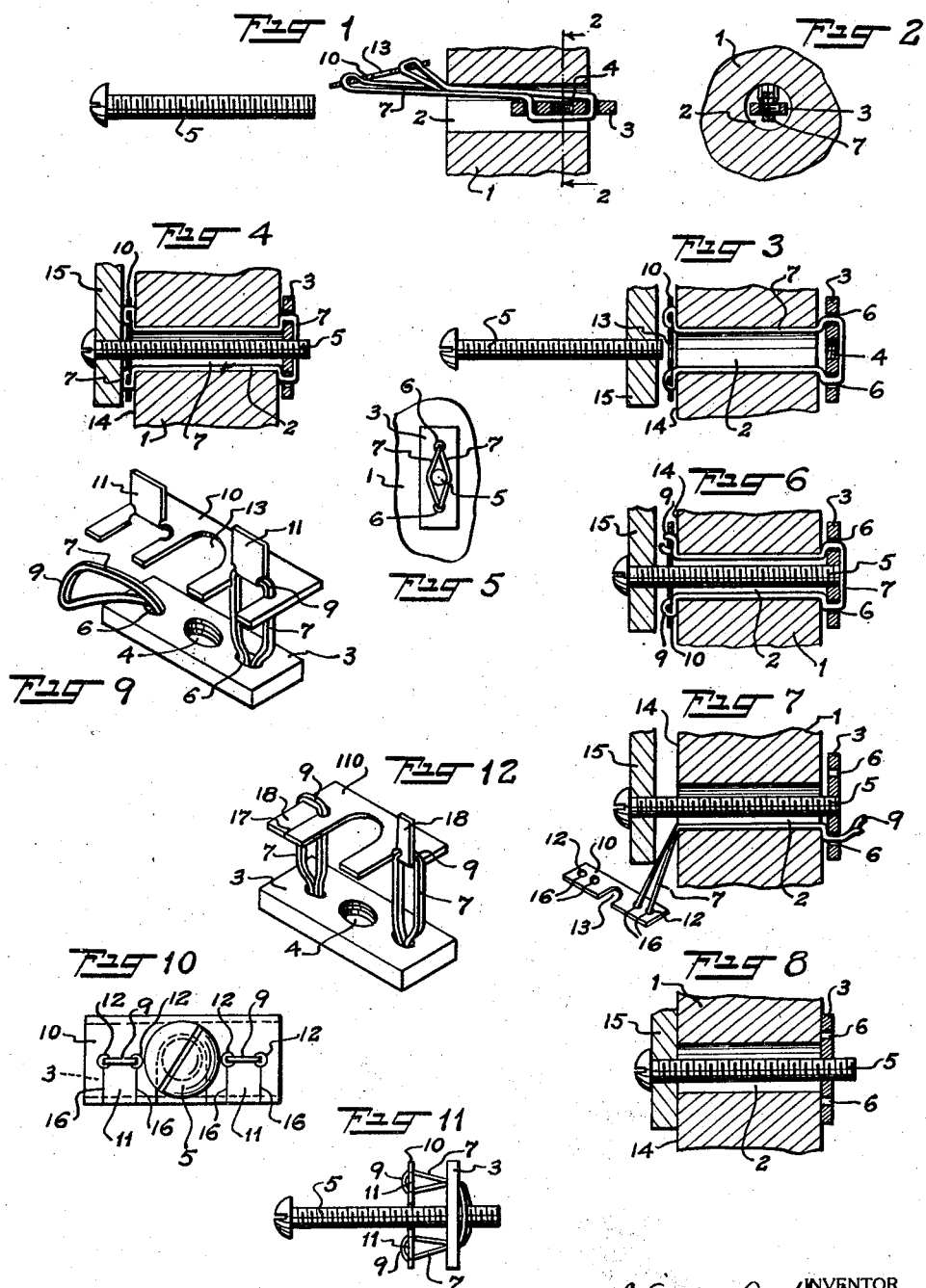

Patented Dec. 30, 1924.

1,521,025

UNITED STATES PATENT OFFICE.

WILLIAM A. HUBENER, OF NEW YORK, N. Y., ASSIGNOR TO DIAMOND EXPANSION BOLT COMPANY, OF NEW YORK, N. Y., A CORPORATION OF NEW YORK.

ANCHOR-BOLT NUT.

Application filed December 6, 1923. Serial No. 678,894.

*To all whom it may concern:*

Be it known that I, WILLIAM A. HUBENER, a citizen of the United States, residing at New York, in the county and State of New York, have made certain new and useful Improvements in Anchor-Bolt Nuts, of which the following is a specification, taken in connection with the accompanying drawings.

My invention relates to anchor bolt nuts, or toggles, which can be used for general application to support an object on a wall or other support, where it is impossible for the nut to be applied directly to a bolt from the inside of the wall because of inaccessibility.

My invention further relates to anchor bolt nuts, or toggles, provided with a resilient pull member which is employed to position the nut on the inside of the wall, and, after the bolt engages the nut, this resilient pull member may, or may not, be removed from the nut.

My invention further relates to such an anchor bolt nut or toggle having a pull member holder, or plate, connecting the ends of the resilient pull member. This plate may be clamped against the wall, or may be discarded so that the work may be brought up flush against the surface of the wall or other suitable support.

My invention further relates to such an anchor bolt nut construction that possesses maximum strength for the size of the nut, and yet is adapted to pass through a hole drilled in the wall very materially smaller than the hole required by other constructions to accommodate nuts or toggles for bolts of the same diameters.

My invention further relates to certain combinations, details of construction, and articles of manufacture, which will be more fully hereinafter described and pointed out in the claims.

In the accompanying drawings, the same reference numerals refer to similar parts in the several figures.

Fig. 1 is a horizontal section showing my anchor bolt nut, or toggle, being positioned in a hole of a wall or other suitable support;

Fig. 2 is a vertical section on the line 2—2 of Fig. 1;

Fig. 3 is a horizontal sectional section, similar to Fig. 1, but showing the parts positioned and about to be engaged by the bolt;

Fig. 4 is a horizontal section, similar to Fig. 3, showing the bolt screwed home and securing the work to a wall or other suitable support, the resilient pull member and pull member holder or plate not being removed;

Fig. 5 is a rear end elevation of Fig. 4;

Fig. 6 is a horizontal section, similar to Fig. 4, but showing the first step in removing the resilient pull member and the pull member holder, prior to tightening the work directly against the face of the wall or other suitable support;

Fig. 7 is a horizontal section, similar to Fig. 6, showing the resilient pull member and the pull member holder being withdrawn;

Fig. 8 is a horizontal section, similar to Fig. 7, in which the resilient pull member and pull member holder have been completely withdrawn and the work secured flush against the surface of the wall or other suitable support;

Fig. 9 is a perspective view of the preferred form of anchor bolt nut or toggle showing the manner of attaching the resilient pull member to the pull member holder or plate;

Fig. 10 is a plan view showing the parts after the tongues have been bent down from the position shown in Fig. 9;

Fig. 11 is a plan view of the complete anchor bolt nut or toggle with its bolt;

Fig. 12 is a perspective view of a modified construction showing the manner of attaching the ends of the resilient pull member to the pull member holder.

My invention is adapted for universal application wherever it is impossible, or inconvenient, to gain access to the rear of a wall, or other suitable support, to apply a nut to a bolt to support any form of work on the wall. It is particularly adapted to be used to support objects or work, of any kind, to walls formed of terra-cotta, brick or any other material.

In drilling holes in such walls, it is essential that they be as small as possible, both for economy in drilling them, and also to avoid marring or weakening the wall.

In my invention the hole is but little larger than the size of the bolt to be used.

To prevent the anchor bolt nut from being lost on the rear of the wall and to permit it to spring automatically into position on the inner inaccessible surface of the wall, I employ a resilient pull member connected, in any suitable manner, to the nut, and which is, or may be, ordinarily placed under some tension when the nut has been positioned on the inner or inaccessible surface of the wall. This resilient pull member will cause the nut to spring back and bridge the hole or opening, as soon as the nut clears the hole, and will hold the nut in position across the hole or opening ready to receive the bolt.

I have shown different embodiments of my invention in the drawings. The wall or other suitable support 1 is provided with a hole 2 of the minimum diameter or size for the particular anchor bolt nut, or toggle, to be employed with it. I preferably employ a nut 3 having a central tapped hole 4 provided with female screw-threads to cooperate with the male threads upon the bolt 5. The nut 3 is also preferably provided with two openings or holes 6, 6 through which a resilient pull member 7 is passed. This member 7 may be formed of any suitable material which is resilient and which will permit manipulation of the nut 3, and at the same time will place some tension upon the nut after it has been located on the inner inaccessible surface 8 of the wall 1. Preferably, though not necessarily, I form my resilient pull member 7 of a rubber band threaded through the holes 6, 6, their ends 9, 9 being brought adjacent to each other and held together in any suitable manner. Preferably, for economy and ease of manufacture, I hold the ends 9, 9 of the rubber band by means of a pull member holder 10 formed, preferably, of sheet metal in the form of a plate having stamped tongues 11, 11 and holes 12, 12. The pull member holder or plate 10 is also provided with a cutaway portion 13 to permit the free passage of the bolt 5.

In assembling my anchor bolt nut or toggle the rubber band or other resilient member is passed through the holes 6, 6 as shown in Fig. 9 and then placed over the tongues 11, 11, which have been bent up into the position shown in Fig. 9. This will permit the rubber band to become seated in the holes 12, 12 of the member 10 so that when the tongues 11, 11 are pressed down to register with the rest of the plate 10, as shown in Fig. 10, the ends 9, 9 of the rubber band will be locked and securely held within the resilient pull member 10. The parts would then be in the position shown in Fig. 10. My anchor bolt nut or toggle may be shipped and sold as shown in Fig. 9, after the tongues have been bent down, or it may be assembled with the bolt 5 and shipped, as shown in Figs. 10 and 11.

In positioning the anchor bolt nut or toggle within the hole 2 the parts are brought into the position shown in Fig. 1, the nut 3 being pushed into the hole 2 until it clears the hole. Preferably, though not necessarily, the length of the different loops of the resilient pull member 7 will be just a little shorter than the thickness of the wall 1 with which they are meant to cooperate. This will insure that the resilient pull member will be placed under more or less tension to get the nut free to engage with the inaccessible surface 8 of the wall. The resiliency of the pull member 7, as soon as the nut 3 clears the opening 2, will then cause the nut to spring back and engage and span the hole 2 so that it can be readily engaged by the bolt 5.

The resilient pull member 7 will at the same time cause the pull member holder or plate 10 to span the hole 2 on the exposed surface 14, the parts then being in the position shown in Fig. 3. The bolt 5 which is usually a stove bolt, though it may be of any suitable character, is passed through the work 15, to be held to the surface 14 of the wall or other suitable support 1, and then through the cutaway portion 13 of the plate or pull member holder 10, until it engages with the screw-threaded hole 4 in the nut 3. By then screwing up upon the bolt 5 the work 15, of any suitable form or construction, will be held firmly to the wall 1, but separated from the outer exposed surface 14 by the plate or pull member holders 10, and a portion of the resilient pull member, Fig. 4.

In practice this plate or pull member 10 is formed of very thin sheet metal, and would only hold the work from the wall 14 a relatively short distance, the resilient pull member being flattened out by the wedging action of the screw.

In some cases, however, it may be desirable to bring the work 15 up flush and in direct contact with the face 14 of the outer surface of the wall. This may be easily done in my invention, by removing the pull member holder or plate 10, and preferably the exposed portion of the resilient pull member 7. I have shown for example, in Fig. 6, where one of the ends 9 of the rubber band or resilient member has been broken, after the bolt 5 has engaged with the nut 3, but prior to screwing the bolt home. By then exerting pressure upon the other end of the plate 10 by a pair of pinchers, or any other suitable tool, the plate 10 can be removed, and also the resilient member as shown in Fig. 7; this will permit the work 15 to be brought up and engaged directly with the surface 14 of the wall or other suitable support 1 as shown in Fig. 8 without being separated from the surface of the wall of the plate 10.

Instead of forming my plate, or pull member holder, as shown more particularly in Fig. 9, in which two cuts or kerfs 16, 16 are employed to form one tongue 11, I may use simply a single cut or kerf 17, as shown in Fig. 12, to form a tongue 18, in which case the ends of the rubber band will extend over the side of the plate or pull member holder 110, Fig. 12, instead of being located entirely within the contour of the plate as in the preferred construction, Fig. 9.

Having thus described this invention in connection with illustrative embodiments thereof, to the details of which I do not desire to be limited, what is claimed as new and what is desired to secure by Letters Patent is set forth in the appended claims.

What I claim is:—

1. A new article of manufacture comprising an anchor bolt nut having a resilient pull member acting in a direction parallel to the axis of the nut and a pull member holder secured to the pull member.

2. A new article of manufacture comprising an anchor bolt nut having a looped resilient pull member and a pull member holder connecting the ends of the looped resilient pull member.

3. A new article of manufacture comprising an anchor bolt nut provided with a threaded hole to engage with a bolt, and with engaging means to support a resilient pull member, and a resilient pull member acting in a direction parallel to the axis of the nut supported by said engaging means.

4. A new article of manufacture comprising an anchor bolt nut provided with a threaded hole to engage with a bolt, and with engaging means to support a resilient pull member, and a resilient pull member supported by said engaging means and a pull member holder connecting the ends of the resilient pull member.

5. A new article of manufacture comprising an anchor bolt nut provided with a threaded hole to engage with a bolt and with holes for the passage of a rubber band, a rubber band passing through said holes, and a plate to secure the ends of the rubber band together.

6. The combination of an anchor bolt nut or toggle provided with a transverse threaded hole to engage with a bolt and with holes to engage a resilient pull member, a resilient pull member, means connecting the ends of said resilient pull member, and a bolt.

7. The combination of an anchor bolt nut or toggle provided with a transverse threaded hole to engage with a bolt and with holes to engage a resilient pull member, a resilient pull member, a plate connecting the ends of said resilient pull member, and a bolt.

8. The combination of an anchor bolt nut or toggle provided with a transverse threaded hole to engage with a bolt and with holes to engage a resilient pull member, a looped resilient pull member, means connecting the loops of said resilient pull member, and a bolt.

9. The combination of an anchor bolt nut or toggle provided with a transverse threaded hole to engage with a bolt and with holes to engage a rubber band, a rubber band cooperating with the holes in the nut, means to connect the ends of the rubber band, and a bolt.

10. The combination of an anchor bolt nut or toggle provided with a transverse threaded hole to engage with a bolt and with holes to engage a rubber band, a rubber band cooperating with the holes in the nut, a plate to connect the ends of the rubber band, and a bolt.

WILLIAM A. HUBENER.

Witnesses:
JOSEPH A. RAMPONE,
JAMES F. CAMPION.